United States Patent [19]
Watson et al.

[11] Patent Number: 5,559,660
[45] Date of Patent: Sep. 24, 1996

[54] INRUSH CURRENT LIMITER

[75] Inventors: Donald R. Watson, Goton; Christopher A. Heyden, Belmont, both of Mass.

[73] Assignee: EMC Corporation, Hopkinton, Mass.

[21] Appl. No.: 215,895

[22] Filed: Mar. 22, 1994

Related U.S. Application Data

[63] Continuation-in-part of Ser. No. 984,351, Dec. 2, 1992, abandoned.

[51] Int. Cl.$^6$ ..................................................... H02H 9/00
[52] U.S. Cl. ........................... 361/58; 323/908; 323/299
[58] Field of Search .................................. 307/125, 135; 323/908, 299; 361/57, 58, 93, 94, 106, 111, 11, 88, 89

[56] References Cited

U.S. PATENT DOCUMENTS

| | | | |
|---|---|---|---|
| 3,656,025 | 4/1972 | Roveti | 317/20 |
| 3,753,079 | 8/1973 | Trilling | 323/4 |
| 3,909,676 | 9/1975 | McConnell | 317/74 |
| 3,927,350 | 12/1975 | McConnell | 317/11 C |
| 3,935,511 | 1/1976 | Boulanger et al. | 317/20 |
| 4,122,312 | 10/1978 | Glenn | 179/16 F |
| 4,176,385 | 11/1979 | Dethlefsen | 361/58 |
| 4,208,708 | 6/1980 | Abraham et al. | 363/57 |
| 4,217,503 | 8/1980 | Hugel et al. | 307/237 |
| 4,371,859 | 2/1983 | Sorimachi | 337/365 |
| 4,400,670 | 8/1983 | Mostosi | 335/6 |
| 4,418,245 | 11/1983 | Le Grand | 179/2.51 |
| 4,424,478 | 1/1984 | Bukhstaber et al. | 322/63 |
| 4,438,474 | 3/1984 | Paice | 361/58 |
| 4,503,365 | 3/1985 | Kirk | 315/310 |
| 4,527,270 | 7/1985 | Sweeton | 371/11 |
| 4,551,637 | 11/1985 | Buck et al. | 307/308 |
| 4,586,011 | 4/1986 | Mostosi | 335/6 |
| 4,600,977 | 7/1986 | Barlian et al. | 362/362 |
| 4,714,974 | 12/1987 | Schreurs et al. | 361/12 |
| 4,727,318 | 2/1988 | Sakai et al. | 324/158 T |
| 4,775,864 | 10/1988 | Herman | 340/825.5 |
| 4,803,485 | 2/1989 | Rypinski | 340/325.05 |
| 4,835,737 | 5/1989 | Herrig et al. | 364/900 |
| 4,858,054 | 8/1989 | Franklin | 361/57 |
| 4,905,230 | 2/1990 | Madge et al. | 370/85.5 |
| 4,926,466 | 5/1990 | Ayello et al. | 379/143 |
| 4,940,969 | 7/1990 | Taylor | 340/653 |
| 4,943,691 | 7/1990 | Mertz et al. | 200/151 |
| 4,956,836 | 9/1990 | Beetwright | 370/16.1 |
| 4,999,787 | 3/1991 | McNally et al. | 364/514 |
| 5,000,531 | 3/1991 | Burberry | 350/96.16 |
| 5,021,914 | 6/1991 | Tsurunaga et al. | 361/19 |
| 5,122,724 | 6/1992 | Criss | 323/222 |
| 5,155,648 | 10/1992 | Gauthier | 323/908 |
| 5,157,771 | 10/1992 | Losi et al. | 395/325 |
| 5,187,653 | 2/1993 | Lorenz | 363/89 |
| 5,210,855 | 5/1993 | Bartol | 395/500 |
| 5,221,888 | 6/1993 | Moody | 323/315 |
| 5,283,707 | 2/1994 | Conners et al. | 361/58 |

FOREIGN PATENT DOCUMENTS

| | | | |
|---|---|---|---|
| 2618276 | 1/1989 | France | H03K 17/08 |
| 2208193 | 8/1989 | United Kingdom | H02H 3/08 |

*Primary Examiner*—William M. Shoop, Jr.
*Assistant Examiner*—Peter Ganjoo
*Attorney, Agent, or Firm*—Weingarten, Schurgin, Gagnebin & Hayes

[57] ABSTRACT

A method and apparatus for preventing current inrush upon the application of power to a load includes the steps of applying a first increasing DC voltage from a voltage source to the load through a single signal path which includes a transistor having a control electrode coupled to the voltage source and a second electrode coupled to the load. The transistor has a first operating region with an ON resistance characteristic which decreases between first and second applied control voltages. The transistor has a second operating mode in which the transistor has a relatively low on resistance $R_{ON}$. The transistor is thus disposed in the single signal path to both limit inrush current and to provide a low loss signal path between the voltage source and the load.

20 Claims, 7 Drawing Sheets

INRUSH CURRENT LIMITER

RELATED CASE INFORMATION

The above-identified patent application is a continuation-in-part of U.S. patent application Ser. No. 07/984,351 entitled INRUSH CURRENT LIMITER, filed Dec. 2, 1992 now abandoned.

FIELD OF THE INVENTION

This invention relates to current limiting circuits and more particularly to current limiting circuits for hot-pluggable devices.

BACKGROUND OF THE INVENTION

As is known in the art, there exists a trend in computer and other types of systems to provide fault-tolerant and redundant circuits. In such systems, when a circuit board or a circuit component fails and thus requires replacement, it is often desirable to replace the circuit board or circuit component without removing the operating power from the system. Thus, in these cases, it is necessary to remove the faulty board or circuit component from the system while the system is still operating and in a similar manner it is necessary to install a repaired or a new circuit board or circuit component into the system which already has power being provided thereto.

That is, the replacement circuit board or circuit component is inserted into a so-called "live" or "hot" system. One problem with removing and installing circuit boards and circuit components into such systems is the occurrence of a large current spike which results from the removal or installation of the circuit board or circuit component. Such current spikes often cause the system voltage to drop to an unacceptable level.

For example, when a replacement printed circuit board provides a large capacitance to the system power supply, the system power supply initially views the impedance as a short circuit impedance. This results in the above-mentioned current spike with the resultant drop of the supply voltage due to the inability of the power supply to source the necessary current. As electrical charge collects due to the capacitive impedance, the current decreases until a steady state current is reached and the power supply voltage returns to its nominal level. Such voltage drops, however, may affect other circuit components and devices within the system since they may be below the minimum voltage levels required by the devices. Thus, it would be desirable to provide a circuit which prevents high currents from flowing into any device or printed circuit board when such a device or printed circuit board is installed into a powered-up system.

SUMMARY OF THE INVENTION

In accordance with the present invention, a current limiting circuit includes a first signal path coupled between a source and a load. Disposed in the first signal path is a first circuit element having a resistance characteristic which decreases in response to increasing temperature and having a first terminal coupled to a voltage source and a second terminal coupled to a load through a first switching device. A control terminal of the switching device is coupled to a first output terminal of a driver circuit and an input terminal of the driver circuit is coupled to the voltage source. The current limiting circuit further includes a second signal path coupled between the source and load wherein the second signal path is coupled in parallel with at least a portion of the first signal path. Disposed in the second signal path are a pair of parallel connected switching devices, each of the switching devices having a control terminal coupled to a second output terminal of the driver circuit through a time delay circuit. With this particular arrangement, a current limiting circuit which may be disposed on a printed circuit board to be installed into a powered up system is provided. When power is applied to the printed circuit board, the driver circuit begins charging an internal charge pump. The driver circuit provides an output voltage to the first switching device. When the switching device is provided as a first switching transistor, the driver circuit output voltage biases the first switching transistor into its conducting state. When the first transistor is biased into its conducting state, a voltage coupled to the input terminal of the current limiting circuit is provided to the load through the first circuit element which may be provided as a thermistor for example. The thermistor initially presents resistance to the voltage which prevents a large amount of current from passing instantaneously therethrough. Thus, the current through the thermistor is initially limited. However, as current passes through and heats the thermistor, the internal resistance of the thermistor decreases. The driver circuit also provides a voltage to the time delay circuit. The time delay circuit provides a time delay before the voltage fed to the control terminals of the pair of switching devices biases the devices such that the devices provide low impedance current paths. Thus, the second signal path initially has a high impedance characteristic relative to the first signal path. After a predetermined amount of time however, the switching devices are biased to provide the second signal path having a relatively low resistance characteristic between the voltage source and the load.

In accordance with a further aspect of the present invention, a method of preventing current inrush includes the steps of applying a first increasing DC voltage to a load through a negative temperature coefficient device having first and second electrical connections and, after a preselected period of time, bypassing the negative temperature coefficient device via a bypass circuit and coupling the increasing voltage to the load through the bypass circuit. With this particular arrangement when the load is coupled to a circuit having the negative temperature coefficient device, the current to the load is initially limited by the resistance characteristics of the negative temperature coefficient device and thus large current surges are prevented from being transferred to the load. After the preselected period of time the current may be provided to the load through the bypass circuit.

In accordance with a further aspect of the present invention, an inrush current limiter circuit for limiting inrush current between a source and a load includes a driver circuit having an input terminal coupled to an input port of the current limiter circuit and an output terminal and a field effect transistor having a gate electrode coupled to the output terminal of the driver circuit, a source electrode coupled to a bias terminal of the inrush current limiter circuit and a drain electrode coupled to an output port of the inrush current limiter circuit. The transistor is activatable by applying a control voltage to the transistor gate. The transistor has first and second operating modes. In the first operating mode, the transistor has a resistance characteristic between drain and source terminals which decreases between a first applied gate-to-source voltage and a second applied higher gate-to-source voltage such that during a predetermined time period the transistor limits inrush current between the source and the load. In the second operating mode the transistor has a substantially constant resistance characteristic. With this particular arrangement an inrush current limiter circuit employing a single signal path is provided. Prior art approaches provide two separate signal paths, i.e. one being a low impedance path and one being a relatively high impedance signal path. The inrush current limiter circuit of the present invention, however, includes only a single signal path having a transistor disposed therein. The transistor is selected such that it provides a high impedance signal path in the off state and a low impedance signal path in the on state (e.g. when the FET operates in its fully enhanced mode). The operating region between the "off" and "on" state of the transistor provides a current limiting characteristic. Thus, the single transistor provides both the low impedance signal path and the high impedance signal path heretofore provided by a pair of separate signal paths in conventional inrush current limiter circuits. The inrush current limiter of the present invention thereby eliminates the need for a second signal path employing a thermistor, relay or the like. In the present invention, the transistor preferably has an "ON" resistance $R_{ON}$ which gradually decreases as a function of transistor gate-to-source voltage $V_{GS}$ between a first gate-to-source voltage $V_{GS1}$ and a second gate-to-source voltage $V_{GS2}$. Furthermore, the transistor is preferably selected to have a relatively low "ON" resistance when biased into saturation. Although not required, a plurality of commonly controlled transistors may be disposed in parallel to reduce the equivalent drain to source resistance $R_{DS}$ and/or increase the current capacity of the signal path between the input and output ports of the inrush current limiter circuit. The inrush current limiter circuit of the present invention thus requires fewer components, is more reliable and may be produced at a cost lower than prior inrush current limiter circuits.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
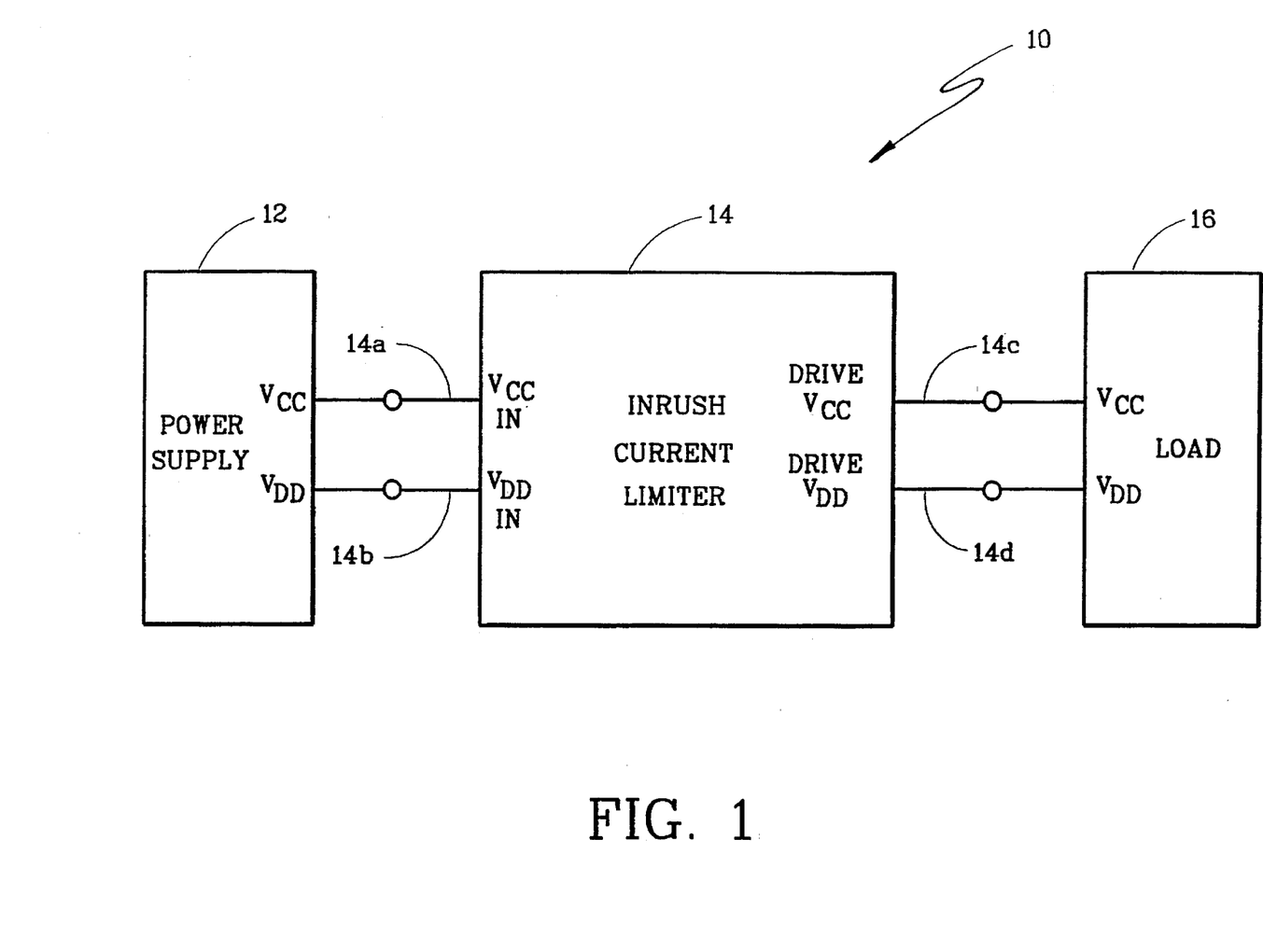
FIG. 1 is a block diagram of a system using the inrush current limiter of the present invention.

Referring now to FIG. 1, a system 10 includes a power supply 12 having a pair of output terminals coupled to a pair of input terminals 14a, 14b of a current limiter circuit 14. The current limiter circuit 14 couples the power supply 12 to a load 16 which may be provided, for example, as a disk drive.

Figure 2:
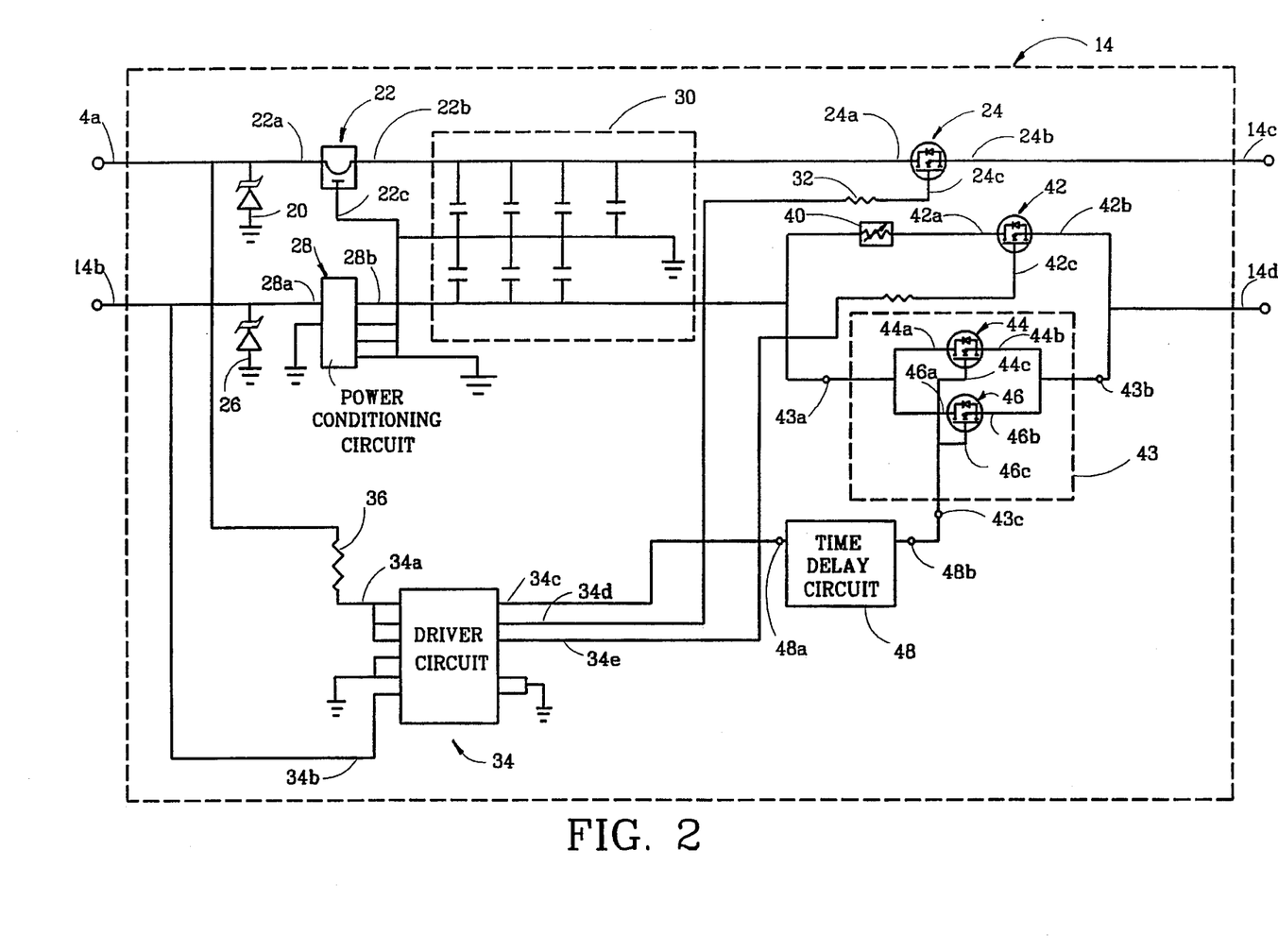
FIG. 2 is a schematic diagram of a first embodiment of an inrush current limiter circuit which may be used in the system of FIG. 1.

Referring now to FIG. 2, a current limiter circuit 14 having a pair of input terminals 14a, 14b and a pair of output terminals 14c, 14d includes a first zener diode 20 having a first terminal coupled to the input terminal 14a and a second terminal coupled to ground. An input terminal 22a of power conditioning circuit 22 is also coupled to the input terminal 14a. An output terminal 22b of the power conditioning circuit 22 is coupled to a source terminal 24a of a metal oxide semiconductor field effect transistor (MOSFET) 24 through a filter circuit 30. A drain terminal 24b of the transistor 24 is coupled to the output terminal 14c of the current limiting circuit 14.

A second zener diode 26 is coupled to the input terminal 14b and a second power conditioning circuit 28 is likewise coupled to the input terminal 14a. The power conditioning circuits 22 and 28 each have input voltages fed thereto from the respective input terminals 14a and 14b and provide at their respective output terminals 22b, 28b a regulated and filtered direct current (DC) voltage.

The filter circuit 30 is coupled to the output ports of each of the power conditioning circuits to further filter the voltage provided at the output terminals of the power conditioning circuits 22, 28. The filter circuit 30 here includes a plurality of capacitors C1–C8 coupled between a signal path and ground as is generally known. Other filtering circuits and techniques may also be employed.

A voltage dropping resistor 32 is coupled between a gate terminal 24C of the transistor 24 and an output terminal 34b of a driver circuit 34. A pair of input terminals 34a, 34b of the driver circuit 34 are coupled to corresponding ones of the pair of input terminals 14a and 14b. Here, a resistor 36 is coupled between the input terminal 14a and the driver circuit input terminal 34a.

The output terminal 28b of the power conditioning circuit 28 is coupled via the filter 30 to the first terminal of a first circuit element 40 having a resistance characteristic which decreases in response to increasing temperature. That is, the circuit element 40 is provided having a negative temperature coefficient resistance characteristic. Thus the circuit element 40 may be provided as a thermistor for example.

A second terminal of the circuit element 40 is coupled to a source terminal 42a of an optional transistor 42. A drain terminal 42 of the transistor 42 is coupled to the output terminal 14d of the current limiter circuit 14. A gate terminal 42c of the transistor 42 is coupled to a second output terminal 34e of the driver circuit 34. Thus the circuit element 40 and transistor 42 provide a first signal path between the output terminal 28b of the power conditioning circuit 28 and the inrush current limiter output terminal 14d.

A bypass circuit 43 has a first terminal 43a coupled to the output terminal 28b of the power conditioning circuit 28 and a second terminal 43b coupled to the inrush current limiter output terminal 14d. Thus the bypass circuit 43 provides a second signal path, parallel to the first signal path, between the power conditioning circuit 28 and the output terminal 14d. In the present embodiment, the bypass circuit 43 here includes third and fourth transistors 44, 46 each having a source terminal 44a, 46a coupled to the bypass circuit input terminal 43a. The drain terminals 44b, 44b of the transistors 44 and 46 are coupled to the bypass circuit output terminal 43b. The gate terminals 44c, 46c of the transistors 44 and 46 are coupled to each other and to a control terminal 43c of the bypass circuit 43.

A time delay circuit 48 is coupled between the driver circuit 34 and the bypass circuit 43 with a first terminal 48a of the time delay circuit 48 coupled to a driver circuit output terminal 34c and a second time delay circuit terminal 48b coupled to the bypass circuit control terminal 43c. It should be noted that the time delay circuit may be provided as an analog or digital time delay circuit suitably selected to provide a predetermined time delay.

Figure 2A:
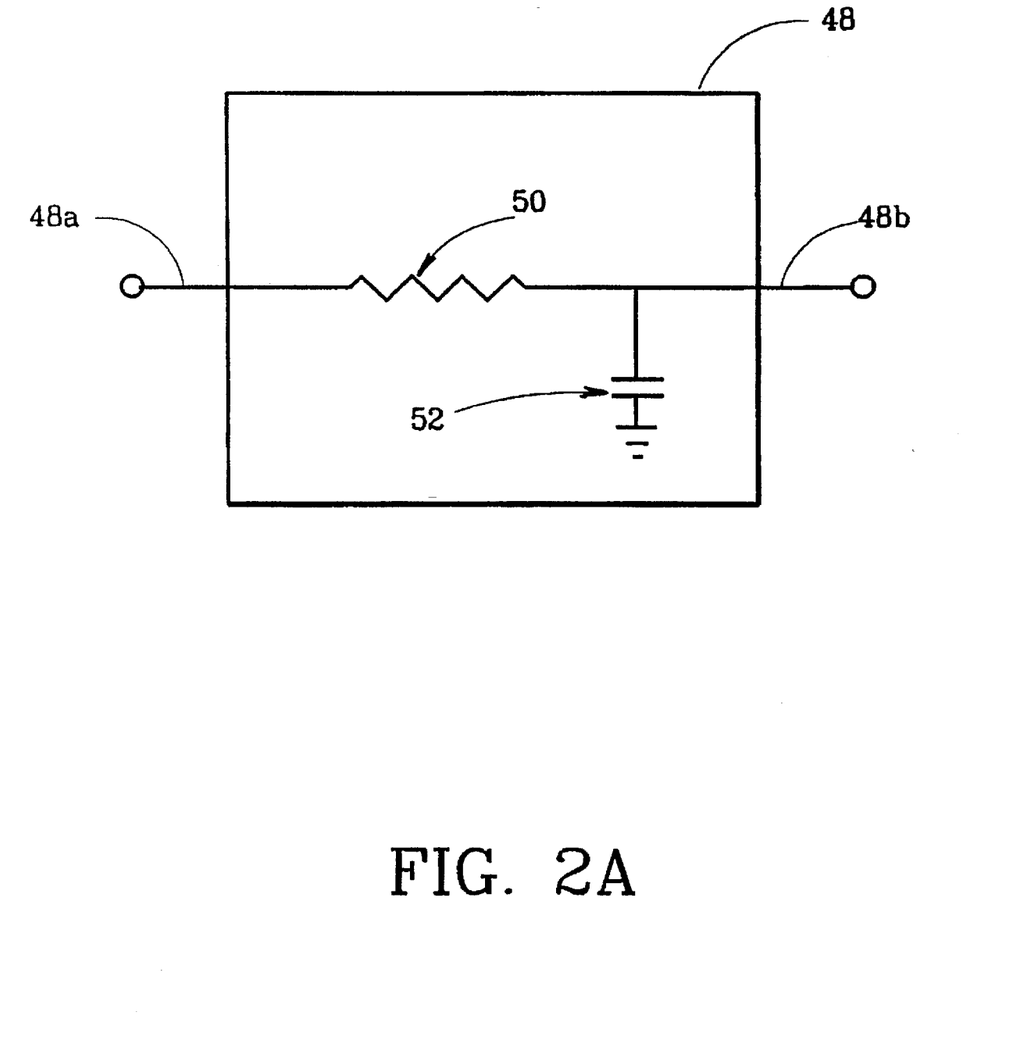
FIG. 2A is a schematic diagram of a time delay circuit which may be used in the inrush current limiter circuit of FIG. 1.

Referring briefly to FIG. 2A, the time delay circuit 48 here includes a first resistor 50 having a first terminal coupled to the first terminal 48a of the time delay circuit 48 and a second terminal coupled to the output terminal of the time delay circuit 48b and a first terminal of a capacitor 52. A second terminal of the capacitor 52 is coupled to ground. Thus, the transistors 44 and 46 have a resistor-capacitor pair coupled to the respective gate terminals 44c, 46c.

Referring again to FIG. 2, when power is applied to the input terminal 14b of the current limiting circuit 14, the driver circuit 34 begins charging an internal charge pump. The driver circuit 34 provides an output voltage on the terminals 34c–34e. When the output voltage on each of the output terminals 34d, 34e reaches a predetermined level, the transistors 24 and 42 are biased into their conducting states.

When transistor 24 is biased into its conducting state, the transistor 24 provides a low impedance signal path between the power conditioning output terminal 28b and the output terminal 14c. Thus, the power applied to the terminal 14a is provided at the output terminal 14c.

When the transistor 42 is placed in its conducting state, the DC voltage provided at the input terminal 14b is coupled to the output terminal 14d of the circuit 14. The circuit 40 having a first impedance level, for example 15 ohms, allows a first predetermined amount of current to flow between the terminals 40a and 40b. As current flows through the circuit 40 and causes heating to occur within the circuit 40, the internal resistance of the circuit 40 decreases. After a predetermined amount of time, the resistance of the circuit 40 may decrease due to the heating to approximately 1.5 ohms for example. Thus, the first resistance of the circuit 40 initially prevents a large amount of current from passing instantaneously therethrough and limits the current. Thereafter, as the temperature of the circuit 40 increases and the resistance decreases, the amount of current which may pass through the circuit 40 increases.

The time delay circuit 48 coupled to the gate terminals 44c, 46c of the transistors 44 and 46 prevents the transistors from being immediately biased into their conducting states. The transistors 44, 46 thus initially provide a high impedance signal path between the terminals 43a and 43b. Thus, the time delay circuit 48 provides the time necessary for the circuit 40 to initially limit the current flow between the terminals 14b and 14d. After this predetermined amount of time, the voltage level at the terminal 14d reaches homeostasis. For example, if the voltage were being provided to a disk drive, this voltage may typically be about 8 volts.

When the voltage level provided to the gate terminals 44c, 46c of the transistors 44 and 46 via the time delay circuit 48 reaches a predetermined level, the transistors 44 and 46 are biased in their low impedance states and the power supply 12 (FIG. 1) coupled to the terminal 14b is coupled to the output terminal 14d via a low resistance path provided by the parallel connected transistors 44 and 46. This resistance, for example, may be on the order of $20 \times 10^{-3}$ ohms. Thus, substantially all of the current will flow through the second signal path provided by the bypass circuit 43.

The transistors 44, 46 are preferably selected having substantially the same electrical characteristics. Thus, when the voltage level is provided to the gate terminals 44c, 46c the transistors 44, 46 are biased into their conducting states at substantially the same time. Furthermore by providing the transistors 44, 46 having the same electrical characteristics, each transistor 44, 46 provides a circuit path having a resistance value such that the current will split evenly between the two circuit paths provided by transistors 44, 46. Furthermore, the transistors 44, 46 are preferably selected having a low forward bias resistance to thus provide a low impedance signal path and minimize the amount of current which may flow along a circuit path provided by the circuit 40.

In some applications it may be desirable to provide the transistors 42, 44, 46 as bipolar junction transistors (BJT) have emitter, base and collector terminals. In the case where the transistors 42, 44, 46 are provided as BJTs, the terminals 42a–46a may correspond to emitter terminals of the BJTs, terminals 42b–46b may correspond to collector terminals of the BJT and terminals 42c–46c may correspond to base terminals of the BJT.

Figure 3:
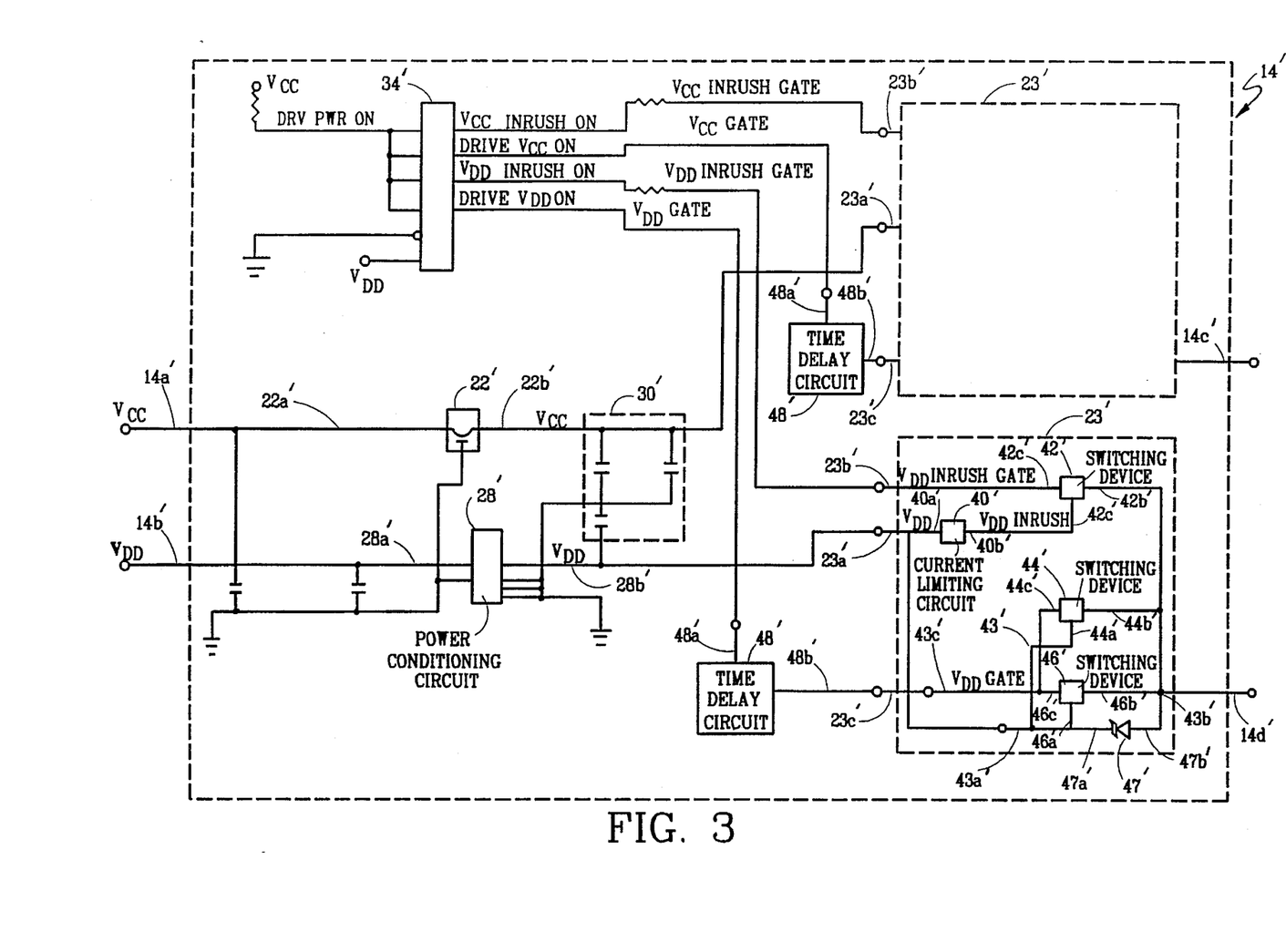
FIG. 3 is a schematic diagram of a second embodiment of an inrush current limiter circuit which may be used in the system of FIG. 1.

Referring now to FIG. 3, a current limiter circuit 14' having a pair of input terminals 14a', 14b' and a pair of output terminals 14c', 14d' includes a power conditioning circuit 22' having an input terminal 22a' coupled to the input terminal 14a'. An output terminal 22b' of the power conditioning circuit 22' is coupled to an input terminal 23a' of a first a current limiting circuit 23'. The operation of the of the current limiting circuit 23' will be described further below. Suffice it here to say that the circuit 23' couples voltage fed thereto at input terminal 23a' to the output terminal 14c'.

A second power conditioning circuit 28' is coupled to the input terminal 14a'. The power conditioning circuits 22' and 28' operate in the same manner as circuits 22 and 28 described in conjunction with FIG. 1 above to provide regulated and filtered direct current (DC) voltage at the output terminals 22b', 28b'.

A filter circuit 30' is coupled to the output ports 22b', 28b' of each of the power conditioning circuits 22', 28' to further filter the voltage provided at the output terminals of the power conditioning circuits 22', 28'.

The output terminal 28b' of the power conditioning circuit 28' is coupled via the filter 30' to a first terminal 23a' of a second current limiting circuit 23'. Each of the current limiting circuits 23' includes a current limiting circuit element 40' having a first terminal 40a' coupled to an input terminal 23a' of the circuit 23' and having a second terminal 40b' coupled to an input terminal 42a' of an optional switching device 42'.

The circuit element 40' may be provided as an inductor having a predetermined inductance selected to limit current of a signal provided thereto. Alternatively the circuit element may be provided as a resistor having a predetermined resistance selected to limit the current of a signal provided thereto. The circuit element 40' may also be provided having a resistance characteristic which decreases in response to increasing temperature. That is, the circuit element 40' may be provided having a negative temperature coefficient resistance characteristic. Thus the circuit element 40' may be provided as a thermistor for example.

A second terminal 42b' of the switching device 42' is coupled to the output terminal 14d' of the current limiter circuit 14'. A control terminal 42c' of the switching device 42' is coupled to a second input terminal 23b' of the current limiting circuit 23' and is subsequently coupled to an output terminal of a driver circuit 34'. Thus the circuit element 40' and the switching device 42' provide a first signal path between the output terminal 28b' of the power conditioning circuit 28' and the inrush current limiter output terminal 14d'.

A bypass circuit 43' has a first terminal 43a' coupled to the output terminal 28b' of the power conditioning circuit 28' and a second terminal 43b' coupled to the inrush current limiter output terminal 14d'. Thus the bypass circuit 43' provides a second signal path, parallel to the first signal path, between the power conditioning circuit 28' and the output terminal 14d'. In the present embodiment, the bypass circuit 43' here includes third and fourth switching devices 44', 46' each having a first terminal 44a', 46a' coupled to the bypass circuit input terminal 43a'. A second terminal 44b', 46b' of the switching devices 44', 46' are coupled to bypass the circuit output terminal 43b'. A control terminal 44c', 46c' of each of the switching devices 44', 46' are coupled to each other and to a control terminal 43c of the bypass circuit 43'.

An cathode 47a' of a current limiting diode 47' is coupled to the terminals 44a', 46a' of the switching devices 44', 46' and an anode 47b' of the diode 47' is coupled to the terminals 44b', 46b'.

A time delay circuit 48' is coupled between the driver circuit 34' and the bypass circuit 43' with a first terminal 48a' of the time delay circuit 48' coupled to a driver circuit output terminal 34c and a second time delay circuit terminal 48b' coupled to the bypass circuit control terminal 43c. As mentioned above in conjunction with FIG. 1, the time delay circuit 48' may be provided as an analog or digital time delay circuit selected to provide a suitable time delay.

Each of the switching devices 42', 44' and 46' may be provided as any circuit element including but not limited to field effect transistors, bipolar junction transistors, diodes, a mechanical relay or any other circuit element capable of providing a signal path having a selectively high impedance characteristic or a selectively low impedance characteristic.

Figure 4:
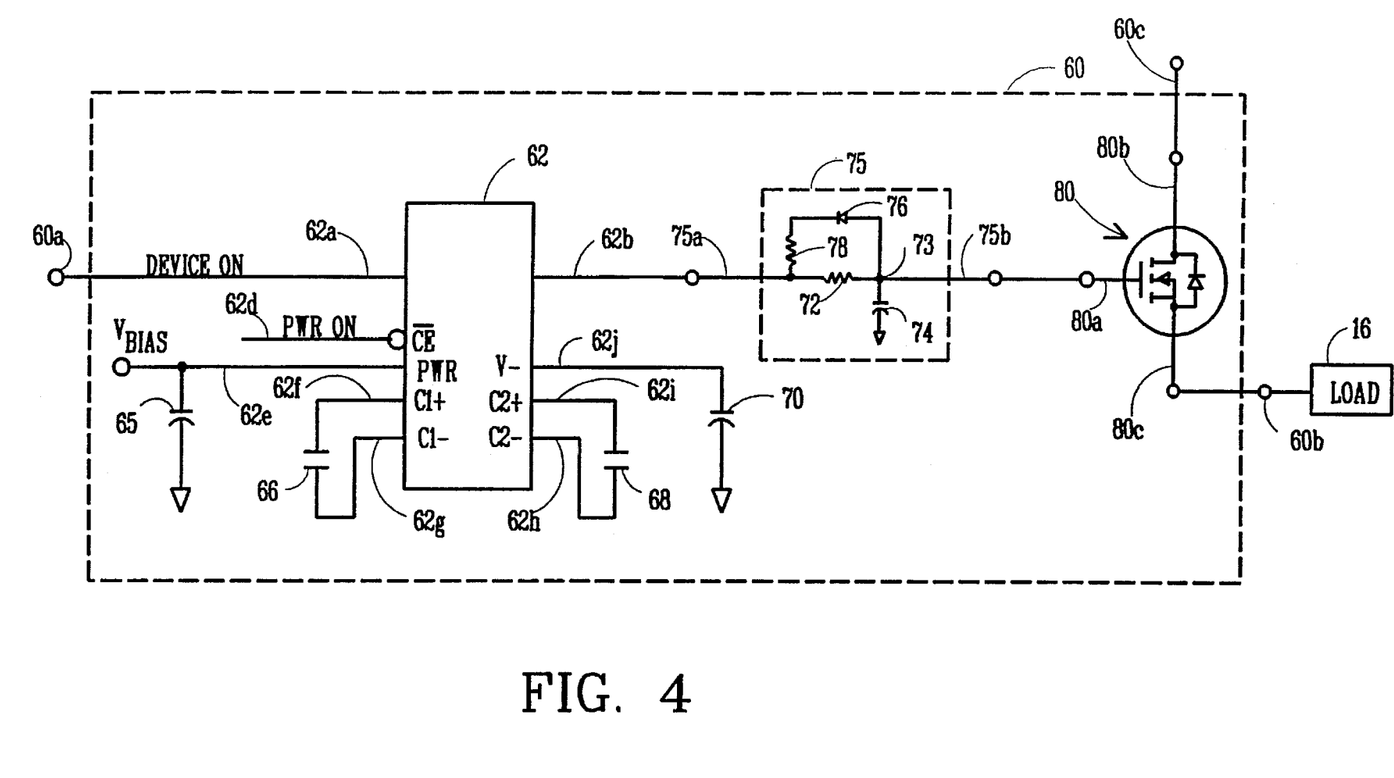
FIG. 4 is a schematic diagram of a second embodiment of an inrush current limiter circuit which may be used in the system of FIG. 1.

Referring now to FIG. 4, an inrush current limiter circuit 60 having an input port 60a, an output port 60b and a bias terminal 60c includes a driver circuit 62 having an input port 62a and an output port 62b. Driver circuit 62 includes a charge pump and may be provided as the type manufactured by Maxim Corporation and identified as part number Max 620 or Max 621. Those of ordinary skill in the art will recognize of course that any driver circuit having suitable electrical characteristics may be used.

A decoupling capacitor 65 is coupled to a power pin 62e of driver circuit 62 while capacitors 66, 68 and 70 are used by the charge pump of driver circuit 62 to increase the voltage at output port 62b to a predetermined voltage having a value approximately 11.5 volts above the $V_{BIAS}$ voltage.

In the present embodiment, input port 62a of driver circuit 62 comprises input port 60a of inrush current limiter circuit 60. Output port 62b of the driver circuit 62 is coupled to a first terminal of a resistor 72. A second terminal of resistor 72 is coupled to a first terminal of a capacitor 74 at a node 73. A second terminal of capacitor 74 is coupled to a first reference potential which in the present embodiment corresponds to ground.

Resistor 72 and capacitor 74 form a time delay circuit 75 having an input port 75a and an output port 75b. Time delay circuit 75 here also includes an optional diode 76 having an anode coupled to node 73 and a cathode coupled to the first electrode of resistor 72 through an optional resistor 78.

A field effect transistor (FET) 80 which may, for example, be provided as a MOSFET of the type manufactured by International Rectifier and identified as part number IRFZ44 has a gate 80a coupled to time delay circuit 75 at node 73.

The resistance value of resistor 72 and the capacitance value of capacitor 74 determine the charge time on gate 80c of FET 80.

It is desirable to have the gate voltage on FET 80 as close to zero as possible such that each time the inrush current limiter circuit 60 is powered up no residual voltage exists across capacitor 74. Thus diode 76 is selected such that capacitor 74 discharges as quickly as possible as limited by the resistance value of resistor 78 which is selected such that capacitor 74 discharges as rapidly as possible without exceeding the sink current specification of driver circuit 62.

When input port 75a is pulled to ground by driver circuit output port 62b, diode 76 and resistor 78 discharge capacitor 74 so that the residual voltage level present on gate 80a is sufficiently low such that FET 80 is biased into its high impedance state. In the preferred embodiment of FIG. 4, a residual voltage on gate 80a is typically between 0 and 700 millivolts to assure that FET 80 is biased into its high impedance state.

A drain 80b of FET 80 is coupled to bias terminal 60c of inrush limiter circuit 60. A voltage source $V_D$ (not shown) is coupled to terminal 60c. The source 80c of FET 80 is coupled to output port 60b of inrush current limiter circuit 60. A load 16 is coupled to output port 60b. In operation, driver circuit 62 provides a voltage to gate 80a which assures a $V_{GS}$ voltage which guarantees saturation of FET 80.

The present inrush current limiter circuit 60 thus includes only a single signal path having transistor 80 disposed therein. Transistor 80 is selected such that it provides a high impedance signal path in the off state and a low impedance signal path in the on state (e.g. when the FET operates in its fully enhanced mode). However, the region between the "off" and "on" state of transistor 80 here provides a current limiting characteristic. That is, transistor 80 provides both the low impedance path and the high impedance signal path of inrush current limiter circuit 60 heretofore provided by a pair of signal paths in conventional circuits. Thus, inrush current limiter circuit 60 of the present invention eliminates the need for a second signal path having a thermistor, relay or the like disposed therein.

FET 80 preferably has an "ON" resistance $R_{ON}$ characteristic which varies as a function of gate-to-source voltage $V_{GS}$ between a first gate-to-source voltage $V_{GS}$ and a second gate-to-source voltage $V_{GS2}$ which assures a useful operating region when FET 80 is employed as an inrush current limiter.

FET 80 is preferably selected having a relatively low "ON" resistance when biased into its saturation state and, although not required, a pair of such FETs may be commonly actuated and disposed in parallel to reduce the resistance of the signal path between the input and output ports 60a, 60b of the inrush current limiter circuit 60. Although FET 80 is presently depicted as a MOSFET, those of ordinary skill in the art will recognize that any transistor having similar electrical characteristics may also be used. It should be noted that driver circuit 62 should be selected having electrical characteristics compatible with the transistor 80.

In many typical applications, MOSFETs are used as switching devices which provide a quick turn on time. That is, FET devices can rapidly switch between a low impedance state and a high impedance state upon the application and removal of a control voltage applied to the gate of the MOSFET for example. Thus, the time period between the time when the MOSFET switches between the low and high impedance states is considered undesirable.

However, in the present invention and as will be explained further in conjunction with FIG. 5 below, the resistive characteristics of FET 80 during the time period between the time when FET 80 switches between its high and low impedance states limits any inrush current in a manner similar to the manner in which a thermistor in a parallel circuit path may be used. The inrush current limiter circuit 60 provides the inrush current limiting function while also eliminating the need for a thermistor or any independent signal path parallel to the signal path provided by FET 80. The present inrush current limiter circuit 60 thus requires fewer circuit components which consequently results in a higher reliability, lower cost circuit.

Figure 5:
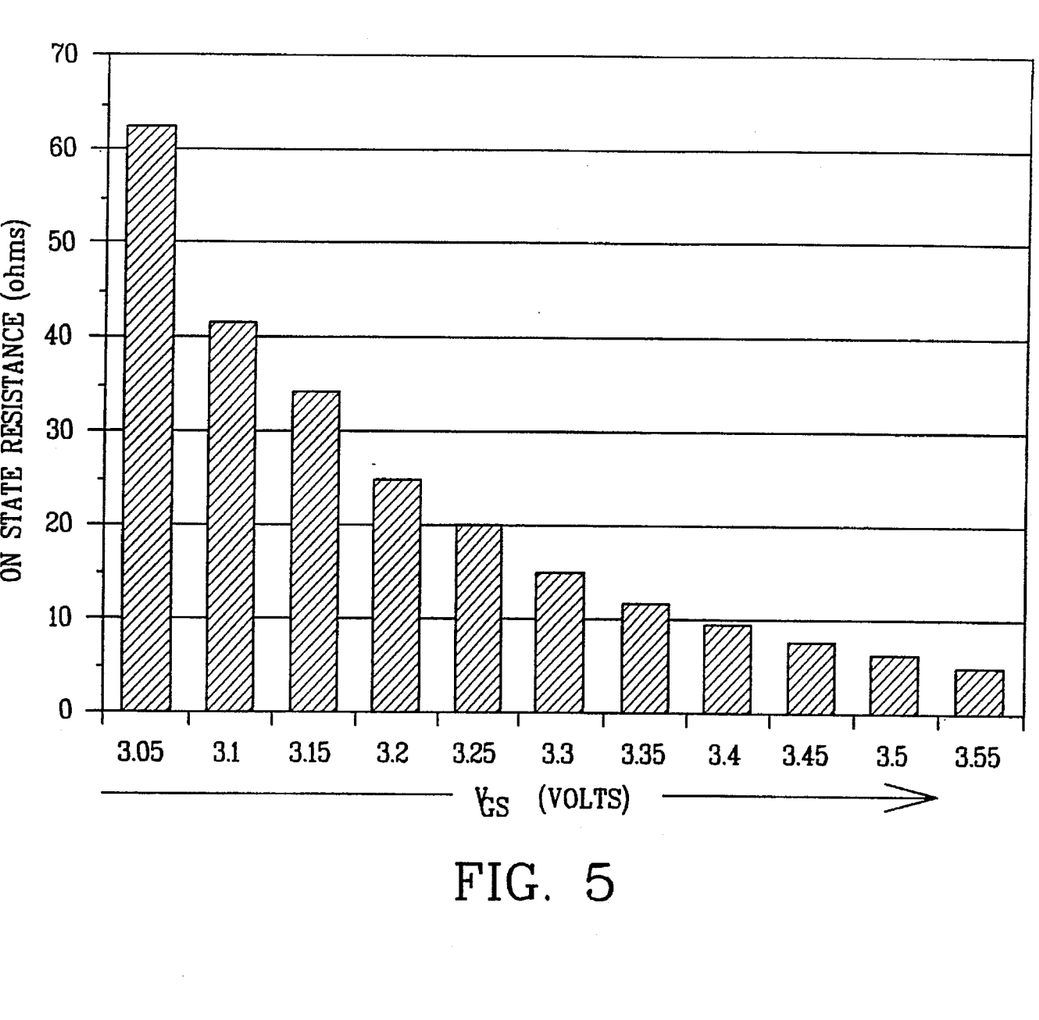
FIG. 5 is a plot of resistance characteristics of a MOSFET which may be used in the circuit of FIG. 4.

Referring now to FIG. 5, a plot of the "ON" resistance $R_{ON}$ as a function of gate-to-source voltage $V_{GS}$ for a MOSFET manufactured by International Rectifier and identified as part number IRFZ44 is shown. The plot shows the FET has an "ON" resistance $R_{ON}$ which decreases as a function of applied gate-to-source voltage $V_{GS}$ as depicted in FIG. 5 with gate-to-source voltage level $V_{GS1}$ corresponding to about 3.05 volts (V) and a second gate-to-source voltage level $V_{GS2}$ corresponding to about 3.55 V.

The MOSFET thus has a first operating region with a resistance characteristic which decreases between first and second applied gate voltages $V_{GS1}$ and $V_{GS2}$ to permit the smooth application of current to the load 16 over a preselected time interval determined by the RC time constant specified by resistor 72 and capacitor 74. The MOSFET also has a second operating region i.e. the saturation region, with a relatively low on resistance $R_{ON}$. FET 80 may thus be disposed in a single signal path and used to both limit inrush current and to provide a low loss signal path.

Figure 6:
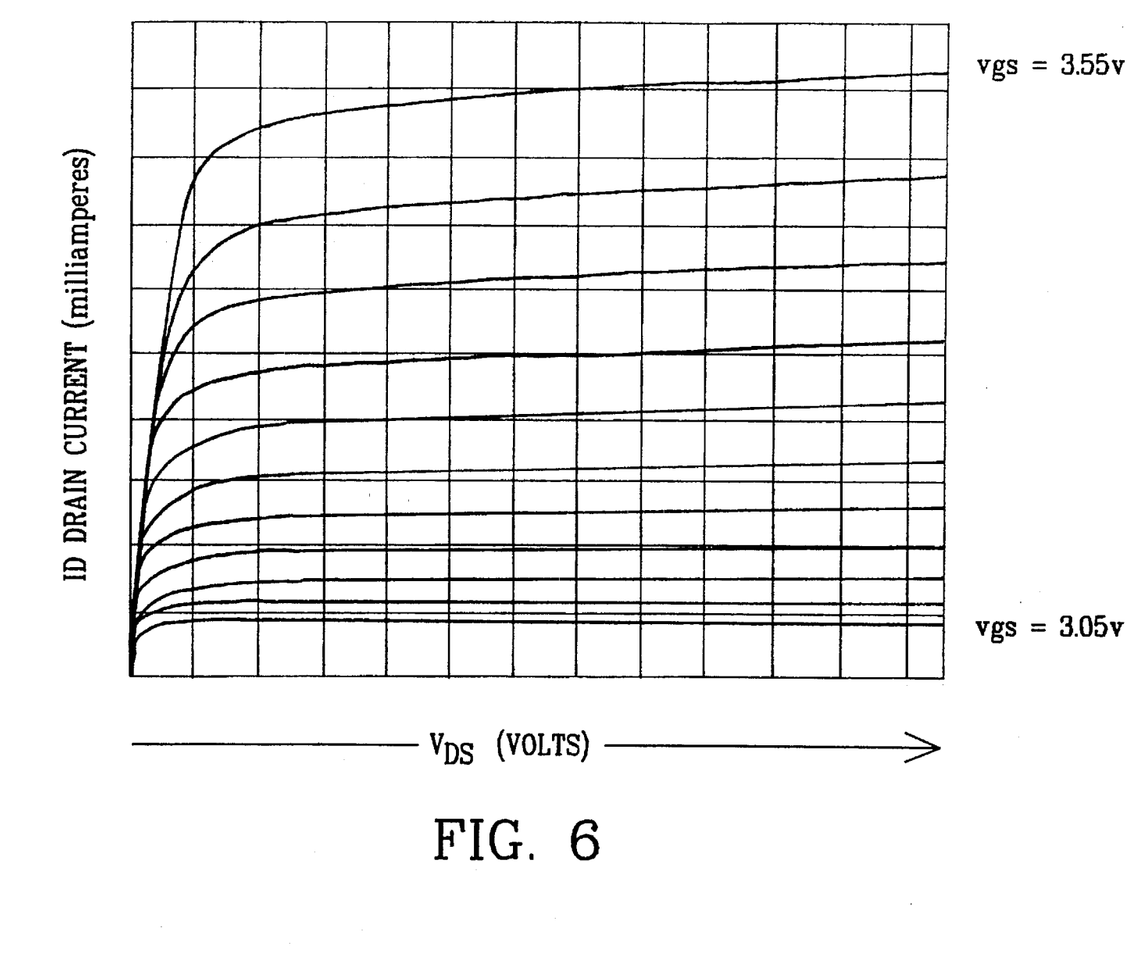
FIG. 6 is a plot of drain current verses drain-to-source voltage as a function of gate-to-source voltage of a MOSFET which may be used in the circuit of FIG. 4.

Referring now to FIG. 6 a plot of drain current as a function of drain source voltage for the FET described above in conjunction with FIG. 5 is shown for gate-to-source voltages $V_{GS}$ voltages between 3.05 V and 3.55 V. As can be seen in FIG. 6 the current through the drain of the transistor increases as the gate-to-source voltage increases from 3.05 V to 3.55 V.

The above described inrush current limiter is illustrative of an improved technique and apparatus for smoothly applying current to a load in a manner which overcomes disadvantages of prior art techniques. Other modifications, embodiments and departures from the present disclosure will be apparent to those of ordinary skill in the art without departing from the inventive concept contained herein. Consequently, the invention is to be viewed as embracing each and every novel feature and novel combination of features present in or possessed by the disclosed current limiter and should be viewed as limited solely by the scope and spirit of the appended claims.

What is claimed is:

1. A method for limiting inrush current between a power source having a predetermined output voltage provided at an output terminal and a load through an active semiconductor device having a current input terminal, a current output terminal and a control input terminal in a controlled manner comprising the steps of:

electrically coupling said output terminal of said power source to said current input terminal and electrically coupling said current output terminal to said load;

applying a control signal to the control input terminal of said active semiconductor device to bias said active semiconductor device into a high impedance state;

varying the control signal during a predetermined time interval to gradually decrease the impedance of said active semiconductor device from said high impedance state to a low impedance state by charging a capacitor connected to said control input terminal of said active semiconductor device; and applying all current from said power source to said load through said active semiconductor device during said biasing and varying steps and following said varying step, wherein said control signal applied to said control input terminal of said active semiconductor device to bias said active semiconductor device into said high impedance state is provided by discharging said capacitor through an output terminal of a driver circuit.

2. The method of claim 1 wherein said active semiconductor device is a field effect transistor.

3. The method of claim 2 wherein said field effect transistor includes a gate connection, a drain connection and a source connection, said control input terminal comprises the gate connection of said field effect transistor, said current input terminal comprises the drain connection of said field effect transistor and said current output terminal comprises the source connection of said field effect transistor, and said biasing step includes the step of establishing a first voltage on the gate connection below said power source predetermined voltage to assure that said field effect transistor is in said high impedance state.

4. The method of claim 3 wherein said varying step includes the step of smoothly varying said bias on the gate connection from said first voltage to a second voltage above said power source predetermined voltage to assure that said field effect transistor is biased into a saturation state at the end of said predetermined time interval.

5. The method of claim 4 wherein said capacitor is connected between said gate connection and a reference voltage connection and said varying step includes the step of gradually increasing the voltage on said gate connection by charging said capacitor through a resistor during said predetermined time interval.

6. The method recited in claim 1 wherein said capacitor is discharged through a diode and a resistor coupled in series between said capacitor and said output terminal of said power source.

7. An inrush current limiter circuit having an input port, an output port and a bias terminal for limiting inrush current between a source and a load, the current limiter circuit comprising:

a driver circuit having an input terminal coupled to the input port of the current limiter circuit and an output terminal; and a transistor having a first terminal coupled to the output terminal of said driver circuit, a second terminal coupled to the bias terminal and a drain electrode coupled to the output port of the inrush current limiter circuit wherein the transistor is activatable by applying a control voltage to the first terminal of said transistor and wherein said transistor has first and second operating modes wherein in the first operating mode said transistor has an on resistance which decreases between a first gate-to-source voltage and a second higher gate-to-source voltage during a predetermined time period such that said transistor limits inrush current between the source and the load during the predetermined time period, said predetermined time period being set by a time delay circuit having an input terminal coupled to the output terminal of said driver circuit and an output terminal coupled to the first terminal of said transistor, said time delay circuit comprising a resistor and a diode coupled in series between said input terminal and said output terminal of said time delay circuit and a capacitor coupled between said output terminal of said time delay circuit and a reference potential, and wherein in the second operating mode said transistor has a substantially fixed on resistance and wherein said transistor transitions from said second operating mode to said first operating mode by discharging said capacitor through said diode and said resistor into said output terminal of said driver circuit.

8. The current limiting circuit of claim 6 wherein said resistor of said time delay circuit has a first terminal coupled to the input terminal of said time delay circuit and a second terminal coupled to the output terminal of said time delay circuit and said capacitor of said time delay circuit has a first terminal coupled to the output terminal of said time delay circuit and a second terminal coupled to a first reference potential.

9. The circuit of claim 8 further comprising means, coupled to said time delay circuit, for rapidly discharging said capacitor.

10. The circuit of claim 9 wherein said means comprises:

a diode having an anode coupled to the output terminal of said time delay circuit and a cathode; and a resistor having a first electrode coupled to the cathode of said diode and having a second electrode coupled to said output terminal of said driver circuit.

11. The circuit of claim 10 wherein said field effect transistor is a field effect transistor having gate, source and drain terminals wherein the first transistor terminal corresponds to the gate terminal, the second transistor terminal corresponds to the source terminal and the third transistor terminal corresponds to the drain terminal of field effect transistor.

12. A current limiting circuit having an input terminal, an output terminal and a bias terminal, the current limiting circuit comprising:

a driver circuit having an input terminal coupled to the input terminal of the current limiting circuit and having an output terminal;

a time delay circuit having a first resistor coupled between a first terminal of said time delay circuit and a second terminal of said time delay circuit, a second resistor and a diode coupled in series between said first terminal of said time delay circuit and said second terminal of said time delay circuit and a capacitor coupled between said second terminal of said time delay circuit and a reference potential, wherein said first terminal of said time delay circuit is coupled to the output terminal of said driver circuit; and a switching device having a first terminal coupled to the second terminal of said time delay circuit, a second terminal coupled to the bias terminal of the current limiting circuit and a third terminal coupled to the output port of the current limiting circuit, said switching device having a first impedance characteristic for a first predetermined period of time and a second lower impedance characteristic for a second predetermined period of time, wherein said time delay circuit provides a time delay before said switching device provides the lower impedance characteristic and wherein said switching device has first and second operating modes wherein in the first operating mode said switching device has a resistance characteristic which gradually decreases between a first applied control voltage and a second applied control voltage wherein the second control voltage is greater than the first control voltage and wherein the first and second control voltages are applied during a predetermined time period such that said switching device limits inrush current between the source and the load during the predetermined time period and wherein in the second operating mode said switching device has a substantially fixed resistance characteristic, and wherein said switching device transitions from said second operating mode to said first operating mode by discharging said capacitor through said second resistor and said diode into said output terminal of said driver circuit.

13. The current limiting circuit of claim 12 wherein said switching device is a field effect transistor wherein the first terminal of said switching device corresponds to a gate electrode of said field effect transistor, the second terminal of said switching device corresponds to a drain electrode of said field effect transistor and the third terminal of said switching device corresponds to a source electrode of said field effect transistor.

14. The circuit of claim 13 further comprising means, coupled to said time delay circuit, for rapidly discharging said capacitor without damaging said driver circuit.

15. The circuit of claim 14 wherein said means comprise:

a diode having an anode coupled to the output terminal of said time delay circuit and a cathode; and a resistor having a first electrode coupled to the cathode of said diode and having a second electrode coupled to said output terminal of said driver circuit.

16. The circuit of claim 15 wherein said field effect transistor is a MOSFET.

17. A method of preventing current inrush comprising the steps of:

applying a first increasing DC voltage from an output terminal of a voltage source to a load through a field effect transistor having a first electrode coupled to said voltage source and a second electrode coupled to said load;

after a preselected period of time, biasing said field effect transistor into an enhanced operating mode by charging a capacitor coupled to a third electrode of said field effect transistor; and turning off said field effect transistor by discharging said capacitor into an output terminal of a driver circuit coupled to said third electrode of said field effect transistor.

18. The method of claim 17 wherein said biasing step comprises the step of charging said capacitor through a resistor to bias said field effect transistor into its enhanced operating mode.

19. The method recited in claim 17 wherein said step of turning off said field effect transistor comprises the step of discharging said capacitor through a diode and a resistor coupled in series between said first electrode of said field effect transistor and said output terminal of said voltage source.

20. An inrush current limiter circuit for limiting the current provided to a load, said inrush current limiter circuit comprising:

a driver circuit having an output terminal at which a control signal is provided;

a transistor having a first terminal adapted for coupling to a source of current to said load, a second terminal adapted for coupling to said load and a third, control terminal responsive to said control signal provided by said driver circuit for presenting a varying impedance between said source and said load, so as to limit said current to said load for a predetermined period of time;

a time delay circuit coupled between said output terminal of said driver circuit and said third, control terminal of said transistor, said time delay circuit comprising a resistor in series between said output terminal of said driver circuit and said third, control terminal of said transistor and a capacitor coupled between said third, control terminal of said transistor and a reference potential; and a discharge circuit coupled between said third, control terminal of said transistor and said output terminal of said driver circuit, said discharge circuit comprising a diode having an anode coupled to the third, control terminal of said transistor and a resistor coupled in series with said diode, said resistor coupled between a cathode of said diode and said output terminal of said driver circuit.

* * * * *

UNITED STATES PATENT AND TRADEMARK OFFICE
CERTIFICATE OF CORRECTION

PATENT NO. : 5,559,660
DATED : September 24, 1996
INVENTOR(S) : Donald R. Watson, et al.

It is certified that error appears in the above-identified patent and that said Letters Patent is hereby corrected as shown below:

Column 11, line 11, claim 8, "claim 6" should read --claim 7--.

Signed and Sealed this

Sixteenth Day of November, 1999

Attest:

Q. TODD DICKINSON

*Attesting Officer*   *Acting Commissioner of Patents and Trademarks*